United States Patent
Lin

(10) Patent No.: US 9,429,251 B1
(45) Date of Patent: Aug. 30, 2016

(54) FOLDABLE ELECTRICAL WIRE ORGANIZER ASSEMBLY

(71) Applicant: Jyh Eng Technology Co., Ltd., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/859,966

(22) Filed: Sep. 21, 2015

(30) Foreign Application Priority Data

Aug. 31, 2015 (TW) ............................. 104214053 U

(51) Int. Cl.
| | |
|---|---|
| *F16L 3/00* | (2006.01) |
| *F16L 3/223* | (2006.01) |
| *F16L 3/08* | (2006.01) |
| *F16M 13/02* | (2006.01) |

(52) U.S. Cl.
CPC ............... *F16L 3/2235* (2013.01); *F16L 3/08* (2013.01); *F16M 13/02* (2013.01)

(58) Field of Classification Search
USPC ..... 248/65, 67.7, 68.1; 174/72 A, 68.1, 68.3
See application file for complete search history.

(56) References Cited

U.S. PATENT DOCUMENTS

| | | | | |
|---|---|---|---|---|
| 6,600,665 | B2 * | 7/2003 | Lauchner | H05K 7/1491 361/825 |
| 6,818,834 | B1 * | 11/2004 | Lin | H02G 3/32 174/135 |
| 7,091,418 | B1 * | 8/2006 | Clark | G02B 6/4452 174/135 |
| 7,510,421 | B2 * | 3/2009 | Fransen | H01R 9/2416 439/449 |
| 8,093,499 | B2 | 1/2012 | Hoffer et al. | |
| 2004/0035983 | A1 * | 2/2004 | Simonson | H02G 15/007 248/49 |
| 2014/0001315 | A1 * | 1/2014 | McNeal | F16L 3/00 248/67.7 |

* cited by examiner

*Primary Examiner* — Steven Marsh
(74) *Attorney, Agent, or Firm* — Guice Patents PLLC

(57) ABSTRACT

A foldable electrical wire organizer assembly includes a faceplate located at a apparatus rack of an apparatus, and an organizer including a base frame that includes a first frame bar and a second frame bar each having a plurality of wire-retaining holes for securing electrical wires and a coupling end located at one end thereof and pivotally coupled to each other with a pivot pin, and two support arms mountable to the faceplate and respectively pivotally connected to the first frame bar and the second frame bar with a respective pivot bolt. Thus, the foldable electrical wire organizer assembly can be folded into a collapsed condition to reduce the overall dimension, saving packaging and delivery costs.

7 Claims, 7 Drawing Sheets

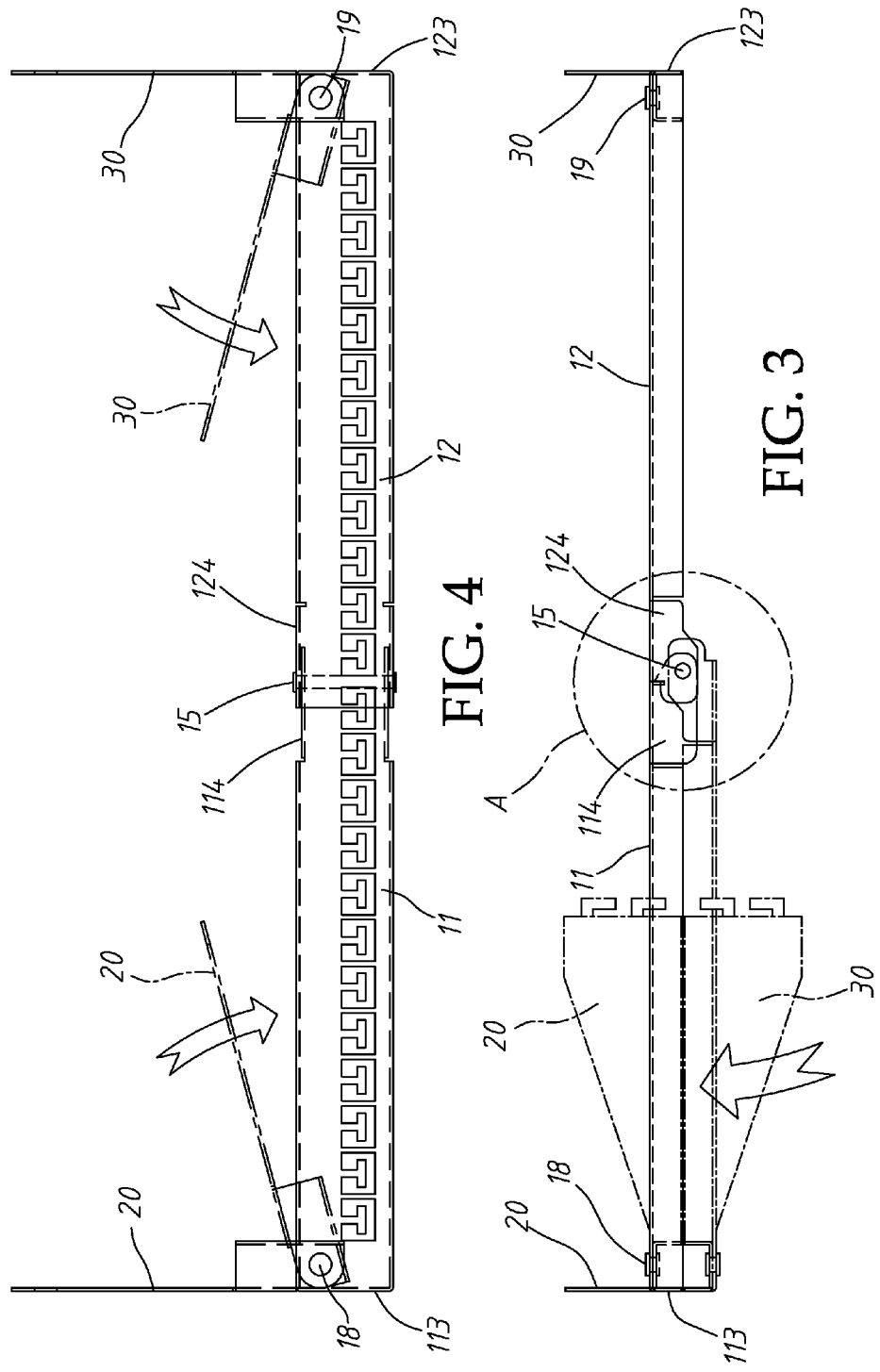

FOLDABLE ELECTRICAL WIRE ORGANIZER ASSEMBLY

BACKGROUND OF THE INVENTION

1. Field of the Invention

The present invention relates to electrical wire organizer designs and more particularly, to a foldable electrical wire organizer assembly, which facilitates quick mounting and dismounting, and can be folded into a collapsed condition to reduce the overall dimension, saving much packaging and delivery costs.

2. Description of the Related Art

A data communication rack or similar apparatus rack is configured for the mounting of electronic components, switches, control faceplate, wire distribution faceplate, and etc. Due to increasing of functions, the number of component parts to be installed in a data communication rack or the like of an apparatus is relatively increased, complicating the organization of the related electrical wires and cables. In order to facilitate maintenance of related electrical connectors, the electrical wires and cables must be installed and arranged in a systematic manner.

U.S. Pat. No. 8,093,499 discloses a cable management system for cable management in an equipment rack that includes two support brackets and a cable bar (horizontal bar). Each support bracket has a body extending between a mounting end and a distal end. The mounting end is configured to attach to the equipment rack, and the body has a tie down slot configured to receive a cable tie down. The cable bar is coupled to the distal end of each support bracket, wherein the cable bar has a tie down slot configured to receive a cable tie down. However, because the support brackets and the cable bar (horizontal bar) have different transverse lengths, the cable management system has a large dimension, increasing the packaging and delivery costs. In installation, the user needs to fasten one end of each support bracket to the equipment rack and then to connect the cable bar (horizontal bar) to the two support brackets, complicating the installation.

SUMMARY OF THE INVENTION

The present invention has been accomplished under the circumstances in view. It is the main object of the present invention to provide a foldable electrical wire organizer assembly, which can be folded into a collapsed condition to reduce the overall dimension, saving much packaging and delivery costs.

It is another object of the present invention to provide a foldable electrical wire organizer assembly, which facilitates quick mounting and dismounting.

To achieve these and other objects of the present invention, a foldable electrical wire organizer assembly is mountable at a faceplate of an apparatus rack of an apparatus for securing electrical wires in a good order, comprising a base frame and two support arms. The base frame comprises a first frame bar and a second frame bar. The first frame bar and the second frame bar each comprise a plurality of wire-retaining holes for securing electrical wires, and a coupling end located at one end thereof and pivotally coupled to each other with a pivot pin. The two support arms are mountable to the faceplate and respectively pivotally connected to an opposite end of the first frame bar and an opposite end of the second frame bar with a respective pivot bolt.

Preferably, the coupling end of the first frame bar comprises a contracted portion, two lugs bilaterally and longitudinally extended from the contracted portion, and a pivot hole located in each lug. The coupling end of the second frame bar comprises two extension portions respectively movably attached to two opposite lateral sides of the contracted portion, and a pivot hole located in each extension portion and pivotally coupled to the pivot hole at each lug by the pivot pin.

Preferably, the two support arms each comprise a pivot-connection end piece located at one end thereof and respectively pivotally connected to the first frame bar and the second frame bar by the respective pivot bolts, and a mounting end piece located at an opposite end thereof and mountable at the faceplate.

Preferably, the pivot-connection end piece of each support arm comprises a pivot hole. The first frame bar and the second frame bar each comprise an axle hole located in the respective opposite end thereof and respectively pivotally coupled to the pivot holes at the pivot-connection end pieces of the support arms by the respective pivot bolts.

Preferably, the mounting end piece of each support arm is comprised of a plurality of hooks.

In an alternate form of the present invention, the foldable electrical wire organizer assembly comprises a faceplate and an organizer. The faceplate comprises a first faceplate member and a second faceplate member. The first faceplate member and the second faceplate member each comprise a plurality of network module mounting holes. The first faceplate member and the second faceplate member each have one end thereof pivotally connected to each other with a pivot pin, and an opposite end thereof respectively terminating in a respective snap structure. The organizer comprises a first frame bar, a second frame bar, and two support arms. The first frame bar and the second frame bar each comprise a plurality of wire-retaining holes for securing electrical wires, a coupling end located at one end thereof and pivotally coupled to each other with a pivot pin, and an opposite end thereof respectively pivotally connected to one end of one respective support arm by a respective pivot bolt. Each support arm comprises a snap structure located at an opposite end thereof and respectively detachably fastened to the first faceplate member and the second faceplate member.

Other advantages and features of the present invention will be fully understood by reference to the following specification in conjunction with the accompanying drawings, in which like reference signs denote like components of structure.

BRIEF DESCRIPTION OF THE DRAWINGS

FIG. 3 is a schematic front view illustrating a folding status of the foldable electrical wire organizer assembly shown in FIG. 1.

FIG. 4 is a schematic sectional view of the foldable electrical wire organizer assembly shown in FIG. 1, illustrating one support arm received in the two support arms respectively turned toward the inside of the first frame bar and the second frame bar.

DETAILED DESCRIPTION OF THE PREFERRED EMBODIMENT

Figure 1:
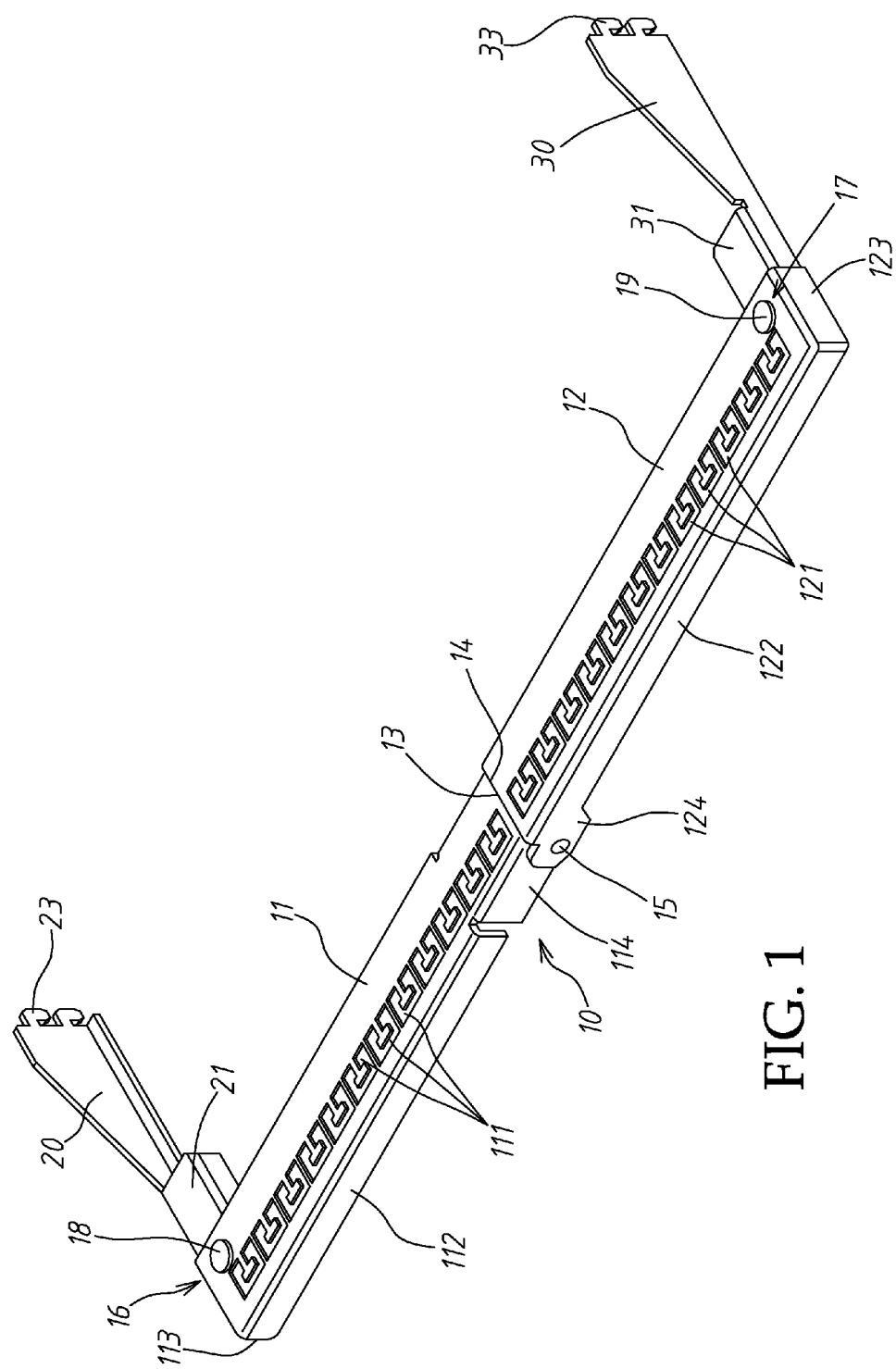
FIG. 1 is an oblique top elevational view of a foldable electrical wire organizer assembly in accordance with the present invention.
Figure 2:
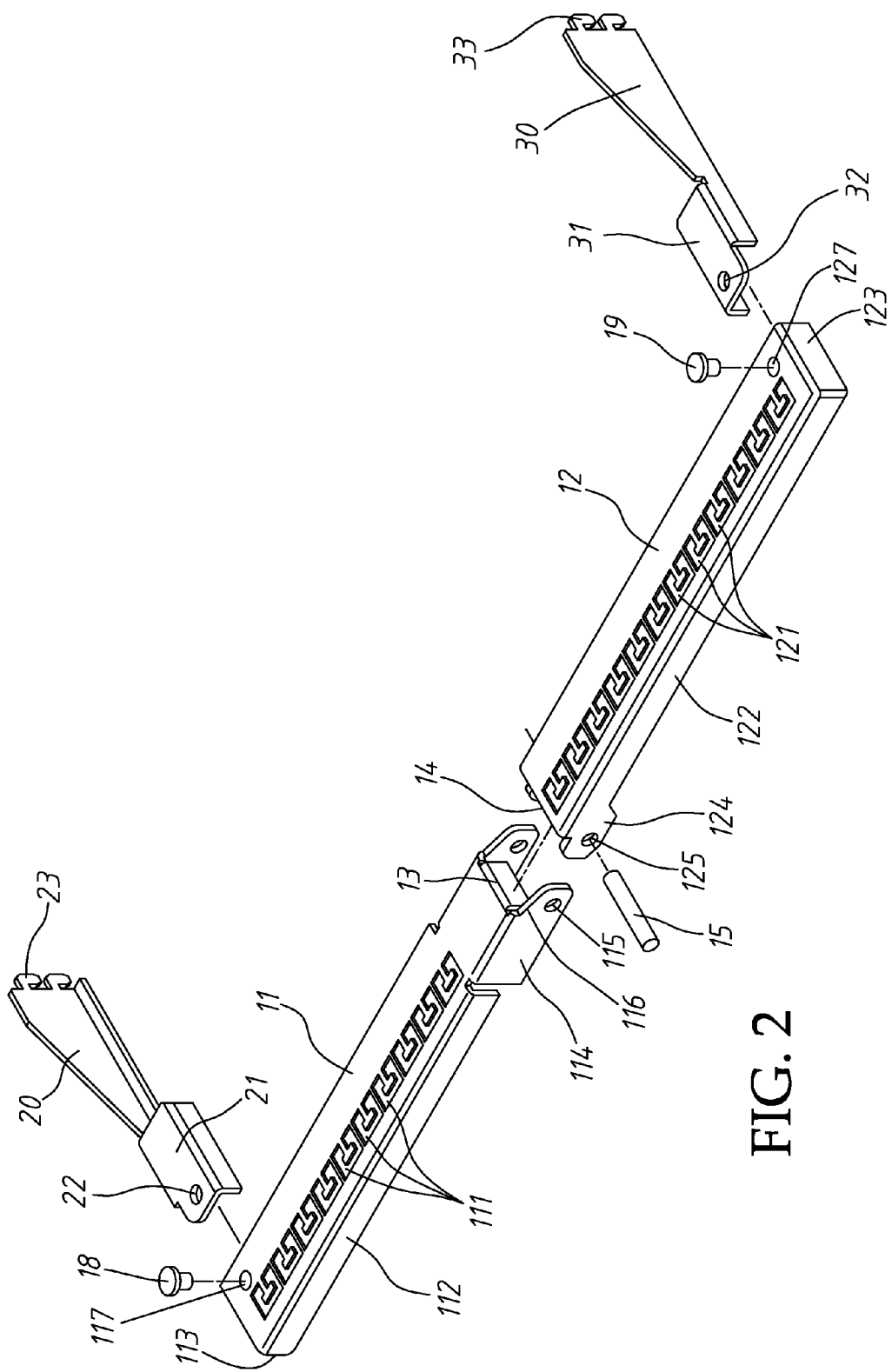
FIG. 2 is an exploded view of the foldable electrical wire organizer assembly shown in FIG. 1.
Figure 6:
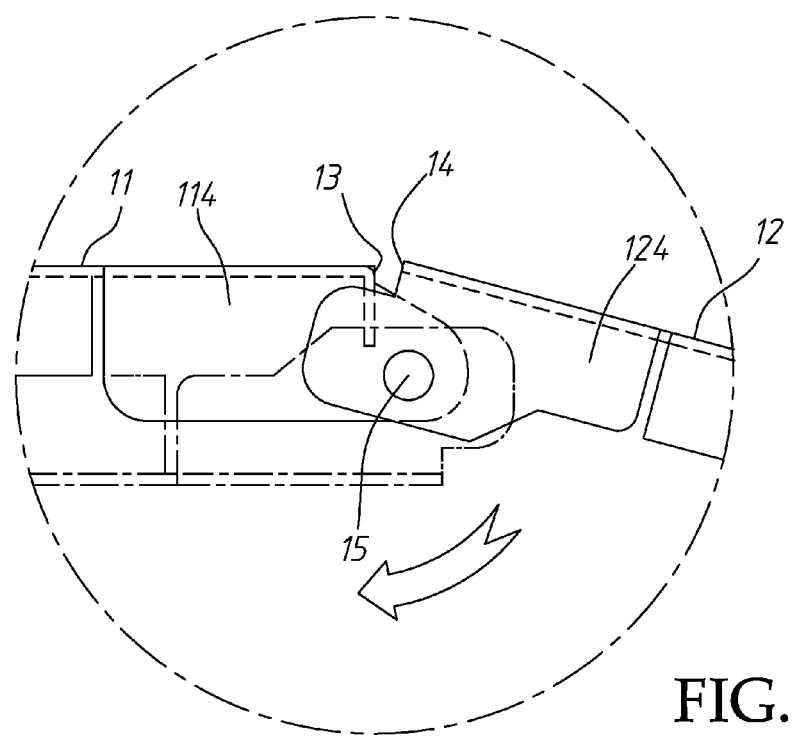
FIG. 6 corresponds to FIG. 5, illustrating the second frame bar turned toward the first frame bar.

Referring to FIGS. 1 and 2, a foldable electrical wire organizer assembly in accordance with the present invention is adapted for mounting at a faceplate 90 (see FIGS. 8 and 9) for holding cables orderly. The foldable electrical wire organizer assembly comprises a base frame 10 and two support arms 20,30. The base frame 10 comprises a first frame bar 11 and a second frame bar 12. The first frame bar 11 and the second frame bar 12 each have a respective coupling end 13,14 pivotally connected to each other with a pivot pin 15, thus, the first frame bar 11 and the second frame bar 12 can be turned about the pivot pin 15 relative to each other between an extended operating position shown in FIG. 1 and a collapsed position shown in FIG. 6. The first frame bar 11 and the second frame bar 12 each further have an opposing mounting end 16,17 respectively pivotally connected to the two support arms 20,30 with a respective pivot bolt 18,19. Further, the first frame bar and the second frame bar 12 each have a plurality of wire-retaining holes 111,121 for securing electrical wire members, In this embodiment, the first frame bar 11 and the second frame bar 12 are flat bars, each have a front flange 112,122 longitudinally disposed at a front side thereof between the coupling end 13,14 and the mounting end 16,17, and a rear end flange 113,123 located at the mounting end 16,17. Further, the coupling end 13 of one frame bar, namely, the first frame bar 11 comprises a U-shaped contracted portion 114, two lugs 116 bilaterally and longitudinally extended from the contracted portion 114 in a parallel manner, and a pivot hole 115 located in each lug 116. The coupling end 14 of the other frame bar, namely, the second frame bar 12 comprises two extension portions 124 respectively movably attached to two opposite lateral sides of the contracted portion 114, and a pivot hole 125 located in each extension portion 124 and pivotally coupled to the pivot holes 115 of the coupling end 13 of the first frame bar 11.

The support arms 20,30 each comprise a pivot-connection end piece 21,31 located at one end thereof, and a pivot hole 22,32 located in the pivot-connection end piece 21,31. The first frame bar 11 and the second frame bar 12 each have an axle hole 117,127 respectively pivotally connected to the pivot holes 22,32 of the support arms 20,30 by the pivot bolts 18,19. The support arms 20,30 each further comprise a mounting end piece 23,33 located at an opposite end thereof for fastening to the faceplate 90 (see FIG. 8). In this embodiment, the mounting end piece 23,33 is comprised of a plurality of hooks.

Figure 5:
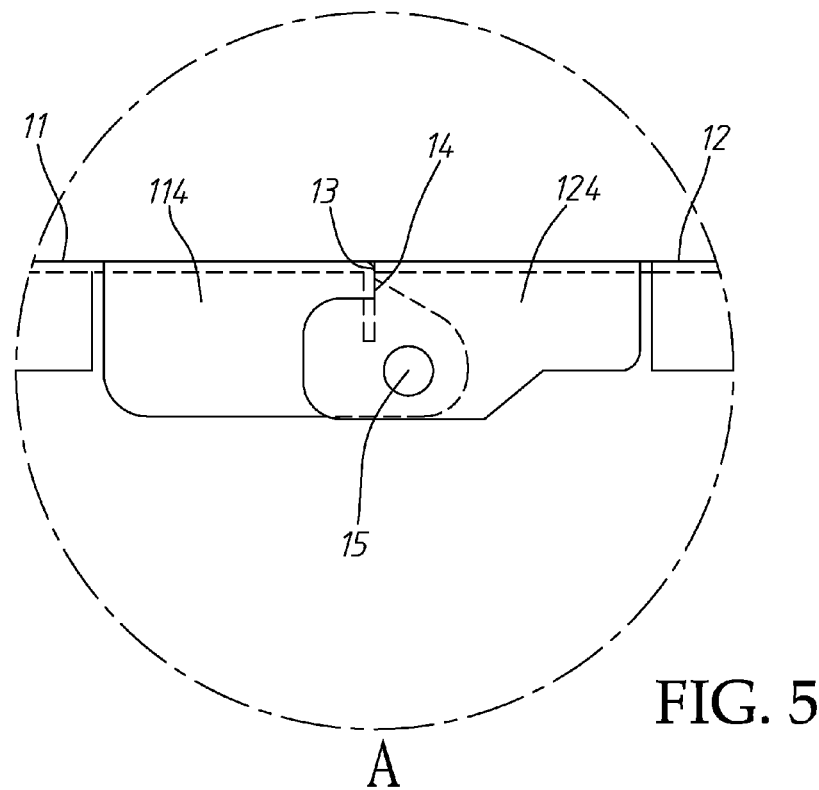
FIG. 5 is an enlarged view of Part A of FIG. 3.
Figure 7:
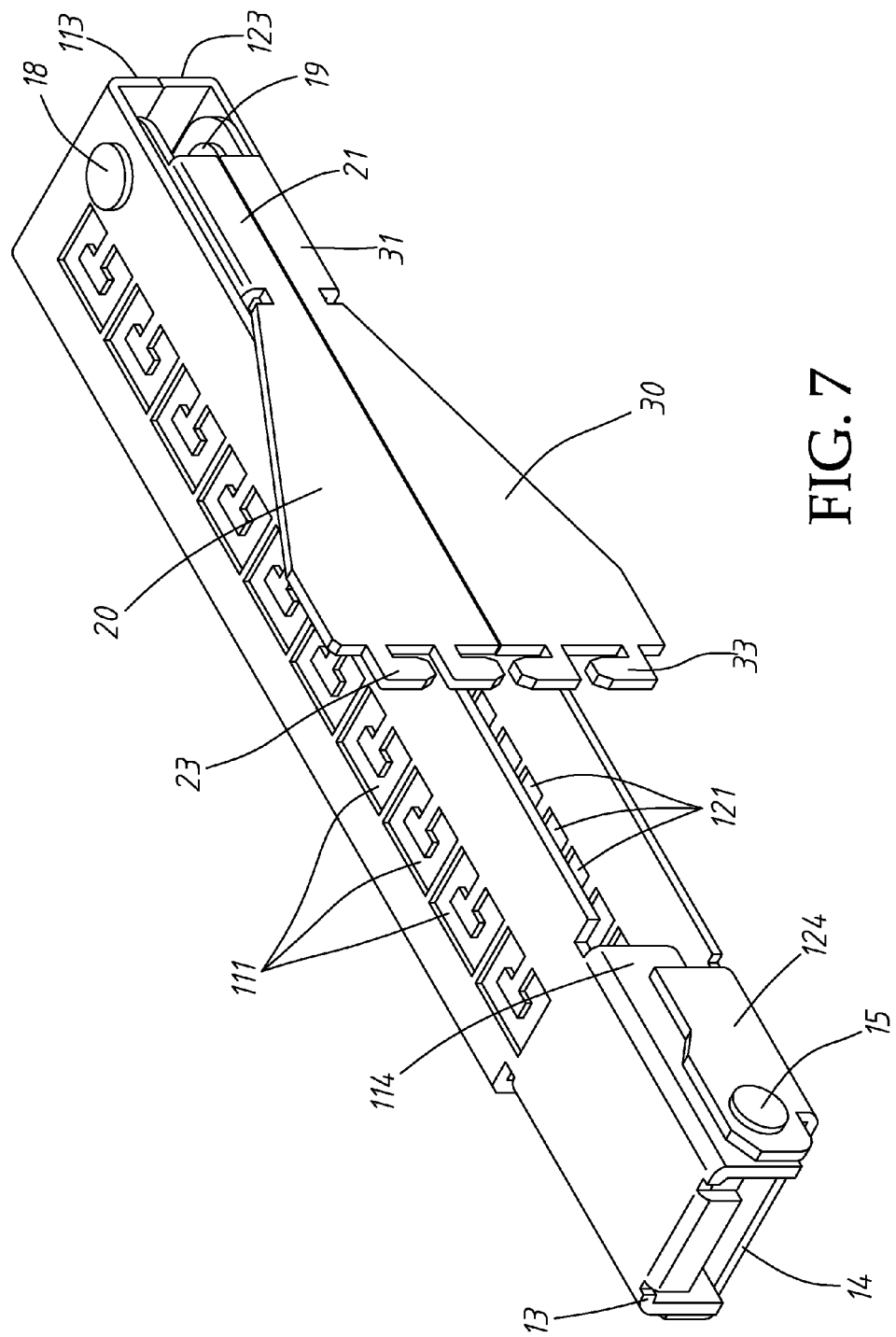
FIG. 7 is an oblique top elevational view illustrating the foldable electrical wire organizer assembly of FIG. 1 in the collapsed position.

As illustrated in FIGS. 3 and 4, the two support arms 20,30 can be turned about the respective pivot bolts 18,19 and respectively closely received in the first frame bar 11 and the second frame bar 12. At this time, as shown in FIG. 5, the first frame bar 11 can be turned about the pivot pin 15 in the manner shown in FIG. 6 to the collapsed position and closely attached to the second frame bar 12, as shown in FIG. 7. Alternatively, the aforesaid procedure can be reversed to extend the foldable electrical wire organizer assembly from the collapsed position to the extended operating position.

Figure 8:
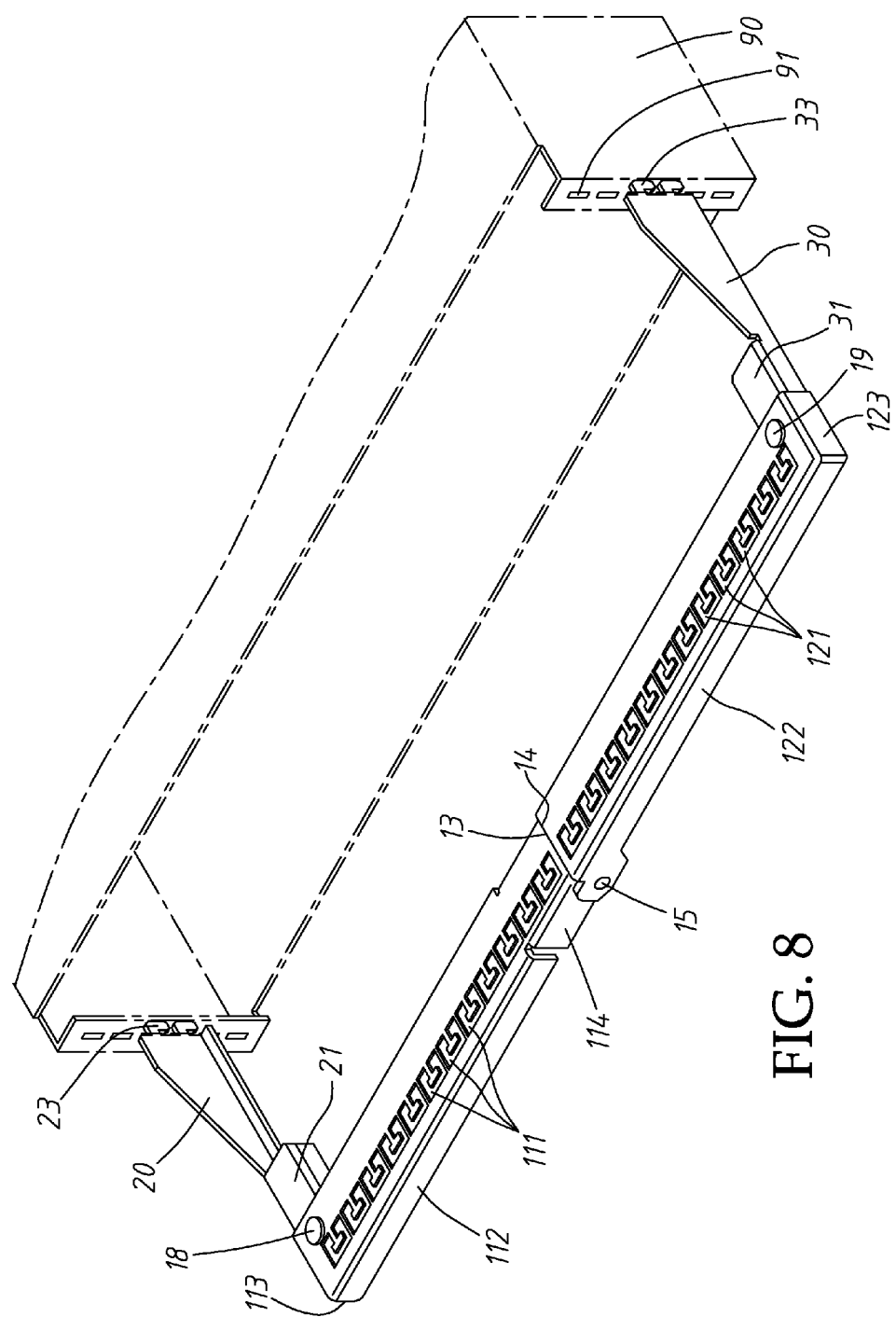
FIG. 8 is an applied view of the present invention, illustrating the foldable electrical wire organizer assembly mounted in a faceplate.

As illustrated in FIG. 8, when the foldable electrical wire organizer assembly is in the extended operating position, the mounting end pieces 23,33 of the support arms 20,30 can be hooked in respective hook holes 91 in the faceplate 90 to secure the foldable electrical wire organizer assembly to the faceplate 90. At this time, electrical wires that are connected to the faceplate 90 can be arranged in a good order and secured to the wire-retaining holes 111,121 of the first frame bar 11 and the second frame bar 12.

Figure 9:
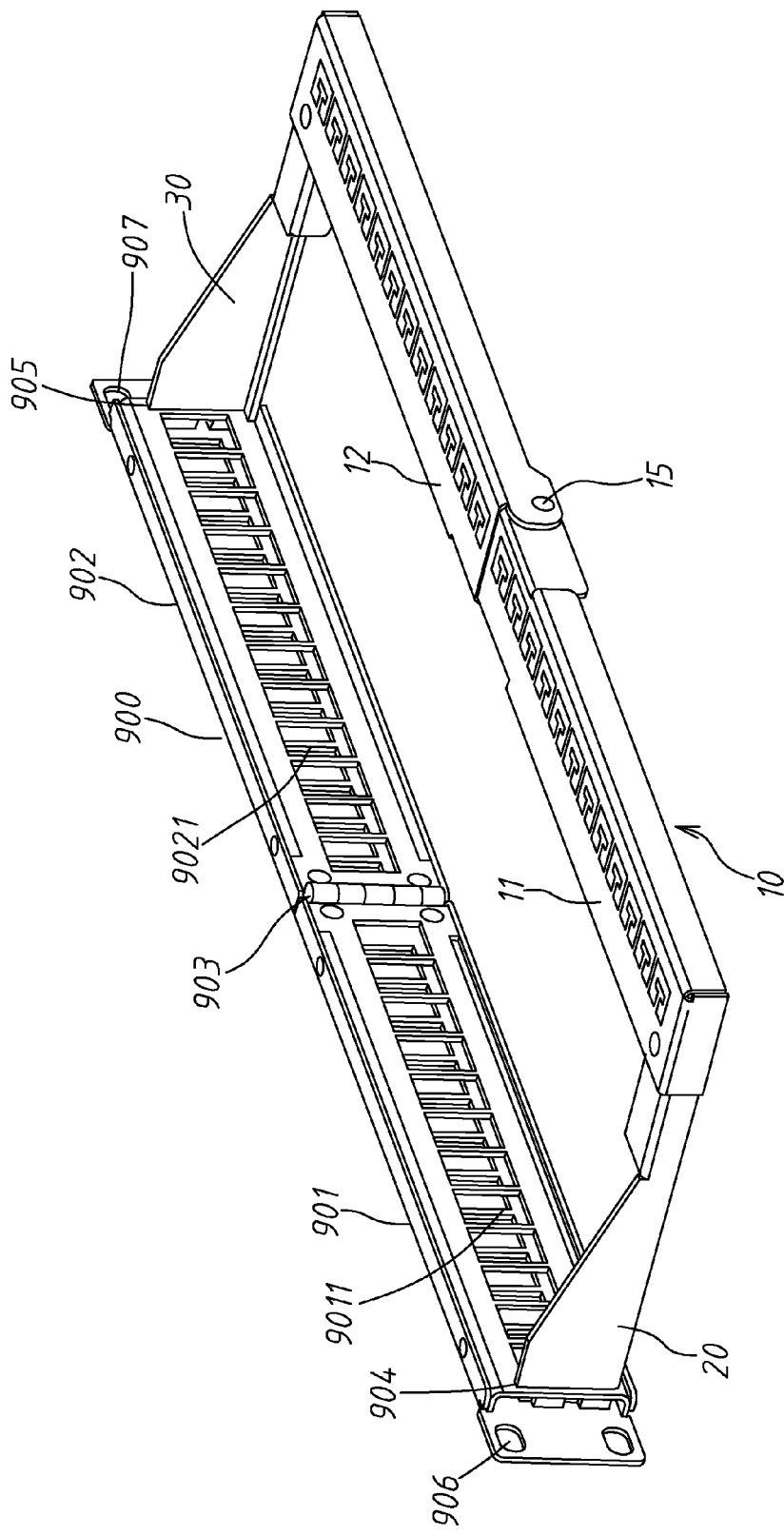
FIG. 9 is an oblique top elevational view of an alternate form of the foldable electrical wire organizer assembly in accordance with the present invention.

In the embodiment shown in FIG. 9, the aforesaid base frame 10 is mounted with a foldable faceplate 900. The faceplate 900 comprises a first faceplate member 901 and a second faceplate member 902. The first faceplate member 901 and the second faceplate member 902 each comprise a plurality of network module mounting holes 9011,9021. The first faceplate member 901 and the second faceplate member 902 have a respective one end thereof respectively pivotally connected to each other with a pivot pin 903, and a respective opposite end terminating in a snap structure 904,905. The support arms 20,30 of the base frame 10 have the respective opposite ends thereof respectively detachably fastened to the snap structures 904,905 of the first and second faceplate members 901,902. The first faceplate member 901 and second faceplate member 902 of the faceplate 900 each have a plurality of mounting holes 906,907 for fastening to a apparatus rack of an apparatus.

After the foldable electrical wire organizer assembly is extended out, it can be directly fastened to the faceplate 90 of the apparatus rack of an apparatus, facilitating quick installation. When the foldable electrical wire organizer assembly is received in the collapsed position, the overall size is greatly reduced, saving much packaging and delivery costs.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A foldable electrical wire organizer assembly mountable at a faceplate of an apparatus rack of an apparatus for securing electrical wires in a good order, the foldable electrical wire organizer assembly comprising:
   a base frame comprising a first frame bar and a second frame bar, said first frame bar and said second frame bar each comprising a plurality of wire-retaining holes for securing electrical wires and a coupling end located at one end thereof and pivotally coupled to each other with a pivot pin; and
   two support arms mountable to said faceplate, said support arms being respectively pivotally connected to an opposite end of said first frame bar and an opposite end of said second frame bar with a respective pivot bolt;
   wherein the coupling end of said first frame bar comprises a contracted portion, two lugs bilaterally and longitudinally extended from said contracted portion and a pivot hole located in each said lug; the coupling end of said second frame bar comprises two extension portions respectively movably attached to two opposite lateral sides of said contracted portion and a pivot hole located in each said extension portion and pivotally coupled to the pivot hole at each said lug by said pivot pin.

2. The foldable electrical wire organizer assembly as claimed in claim 1, wherein said two support arms each comprise a pivot-connection end piece located at one end thereof and respectively pivotally connected to said first frame bar and said second frame bar by the respective said pivot bolts, and a mounting end piece located at an opposite end thereof and mountable at said faceplate.

3. The foldable electrical wire organizer assembly as claimed in claim 2, wherein the pivot-connection end piece of each said support arm comprises a pivot hole; said first frame bar and said second frame bar each comprise an axle hole located in the respective opposite end thereof and respectively pivotally coupled to the pivot holes at the pivot-connection end pieces of said support arms by the respective said pivot bolts.

4. The foldable electrical wire organizer assembly as claimed in claim 2, wherein said mounting end piece of each said support arm is comprised of a plurality of hooks.

5. A foldable electrical wire organizer assembly, comprising:
   a faceplate comprising a first faceplate member and a second faceplate member, said first faceplate member and said second faceplate member each comprising a plurality of network module mounting holes, said first faceplate member and said second faceplate member each have one end thereof pivotally connected to each other with a pivot pin and an opposite end thereof respectively terminating in a respective snap structure; and
   an organizer comprising a first frame bar, a second frame bar and two support arms, said first frame bar and said second frame bar each comprising a plurality of wire-retaining holes for securing electrical wires and a coupling end located at one end thereof and pivotally coupled to each other with a pivot pin and an opposite end thereof respectively pivotally connected to one end of one respective said support arm by a respective pivot bolt, each said support arm comprising a snap structure located at an opposite end thereof and respectively detachably fastened to said first faceplate member and said second faceplate member.

6. The foldable electrical wire organizer assembly as claimed in claim 5, wherein said first faceplate member and said second faceplate member of said faceplate each comprise a plurality of mounting holes for fastening to a apparatus rack of an apparatus.

7. The foldable electrical wire organizer assembly as claimed in claim 5, wherein the coupling end of said first frame bar comprises a contracted portion, two lugs bilaterally and longitudinally extended from said contracted portion and a pivot hole located in each said lug; the coupling end of said second frame bar comprises two extension portions respectively movably attached to two opposite lateral sides of said contracted portion and a pivot hole located in each said extension portion and pivotally coupled to the pivot hole at each said lug by said pivot pin.

* * * * *